(12) United States Patent
Cobb

(10) Patent No.: US 11,428,841 B2
(45) Date of Patent: Aug. 30, 2022

(54) RETAINING A PLURALITY OF FERRITE OBJECTS IN AN ANTENNA OF A DOWNHOLE TOOL

(71) Applicant: Halliburton Energy Services, Inc., Houston, TX (US)

(72) Inventor: James Howell Cobb, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 49 days.

(21) Appl. No.: 16/630,997

(22) PCT Filed: Dec. 18, 2017

(86) PCT No.: PCT/US2017/066945
§ 371 (c)(1),
(2) Date: Jan. 14, 2020

(87) PCT Pub. No.: WO2019/125353
PCT Pub. Date: Jun. 27, 2019

(65) Prior Publication Data
US 2021/0364667 A1    Nov. 25, 2021

(51) Int. Cl.
*G01V 3/30* (2006.01)
*E21B 47/01* (2012.01)
(Continued)

(52) U.S. Cl.
CPC .............. *G01V 3/30* (2013.01); *E21B 47/01* (2013.01); *E21B 49/00* (2013.01); *H01Q 1/04* (2013.01); *H01Q 7/06* (2013.01)

(58) Field of Classification Search
None
See application file for complete search history.

(56) References Cited

U.S. PATENT DOCUMENTS 3,900,233 A    8/1975    Thomson
4,082,374 A    4/1978    Ernst et al.
(Continued)

FOREIGN PATENT DOCUMENTS

EP    1413784 A2    10/2003

OTHER PUBLICATIONS

International Search Report and The Written Opinion of the International Search Authority, or the Declaration, dated Sep. 18, 2018, PCT/US2017/066945, 14 pages, ISA/KR.
(Continued)

*Primary Examiner* — Douglas X Rodriguez
(74) *Attorney, Agent, or Firm* — Haynes and Boone, LLP

(57) ABSTRACT

A tool that uses antennas to evaluate an environment surrounding a wellbore, where the tool can include a sleeve with an antenna mounted thereon, and the antenna including a ferrite assembly and a coil assembly, where the coil assembly can be mounted radially outward from the ferrite assembly, and the coil assembly can transmit electromagnetic signals into the environment and/or receive the electromagnetic signals from the environment. The electromagnetic signals can be evaluated to determine one or more parameters of the environment surrounding the wellbore. The tool can include one or more grooves disposed in a wall of a sleeve of the ferrite assembly, with one or more ferrite objects installed in the grooves, with a cross-sectional shape that can retain the ferrite objects in the groove. The ferrite objects can alter a trajectory of one or more of the electromagnetic signals.

18 Claims, 14 Drawing Sheets

(51) Int. Cl.
*E21B 49/00* (2006.01)
*H01Q 1/04* (2006.01)
*H01Q 7/06* (2006.01)

(56) References Cited

U.S. PATENT DOCUMENTS

| | | |
|---|---|---|
| 4,577,673 A | 3/1986 | Harada et al. |
| 5,335,587 A | 8/1994 | Stoll |
| 5,441,346 A | 8/1995 | Ishihara |
| 5,980,820 A | 11/1999 | Takeuchi |
| 7,229,212 B2 | 6/2007 | Takeuchi |
| 7,836,860 B2 | 11/2010 | Patel et al. |
| 8,745,848 B2 | 6/2014 | Lang |
| 9,624,972 B2 | 4/2017 | Kikuchi |
| 9,921,333 B2* | 3/2018 | Prakash .................. G01V 3/28 |
| 10,254,430 B2* | 4/2019 | Fang ....................... E21B 49/00 |
| 2009/0314498 A1* | 12/2009 | Kannan ............... E21B 17/1035 166/385 |
| 2016/0369578 A1 | 12/2016 | Korovin et al. |
| 2017/0051579 A1 | 2/2017 | Hay |
| 2017/0160423 A1 | 6/2017 | Prakash et al. |

OTHER PUBLICATIONS

Slocum, "Fundamentals of Design—Topic 10 Bearings," Jan. 1, 2008.

* cited by examiner

US 11,428,841 B2

RETAINING A PLURALITY OF FERRITE OBJECTS IN AN ANTENNA OF A DOWNHOLE TOOL

CROSS REFERENCE TO RELATED APPLICATIONS

The present application is a U.S. National Stage patent application of International Patent Application No. PCT/US2017/066945, filed on Dec. 18, 2017, the benefit of which is claimed and the disclosure of which is incorporated herein by reference in its entirety.

TECHNICAL FIELD

The present disclosure generally relates to oilfield equipment and, in particular, to downhole tools, drilling and related systems and techniques for retaining ferrite objects in a downhole tool. More particularly still, the present disclosure relates to methods and systems for retaining ferrite objects in an antenna assembly.

BACKGROUND

In order to produce formation fluids from an earthen formation, wellbores can be drilled into the earthen formation to a desired depth for producing the formation fluids. During and/or after drilling a wellbore, various antennas can be deployed into the wellbore in a drill string assembly and/or a wireline logging tool to measure various wellbore parameters (e.g. formation resistivity, formation permeability, ranging distance and direction, tubing string integrity, cement sheath integrity, etc.). Loop antennas can be used as transmitters to inject energy (e.g. electrical, electromechanical, magnetic flux, etc.) into an earthen formation surrounding a wellbore. Loop antennas can also be used as receivers to receive energy from the earthen formation. Both the transmission and reception of energy by the antennas can be directly impacted by the efficiencies of the antennas. Ferrite material can be used to urge both transmission and reception energies in desired directions, but retaining the ferrite material in the antenna can be problematic.

Therefore, it will be readily appreciated that improvements in the arts of retaining ferrite beads to shield and/or direct signals to/from antennas are continually needed.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. Embodiments are described in detail hereinafter with reference to the accompanying figures, in which.

DETAILED DESCRIPTION OF THE DISCLOSURE

Figure 1:
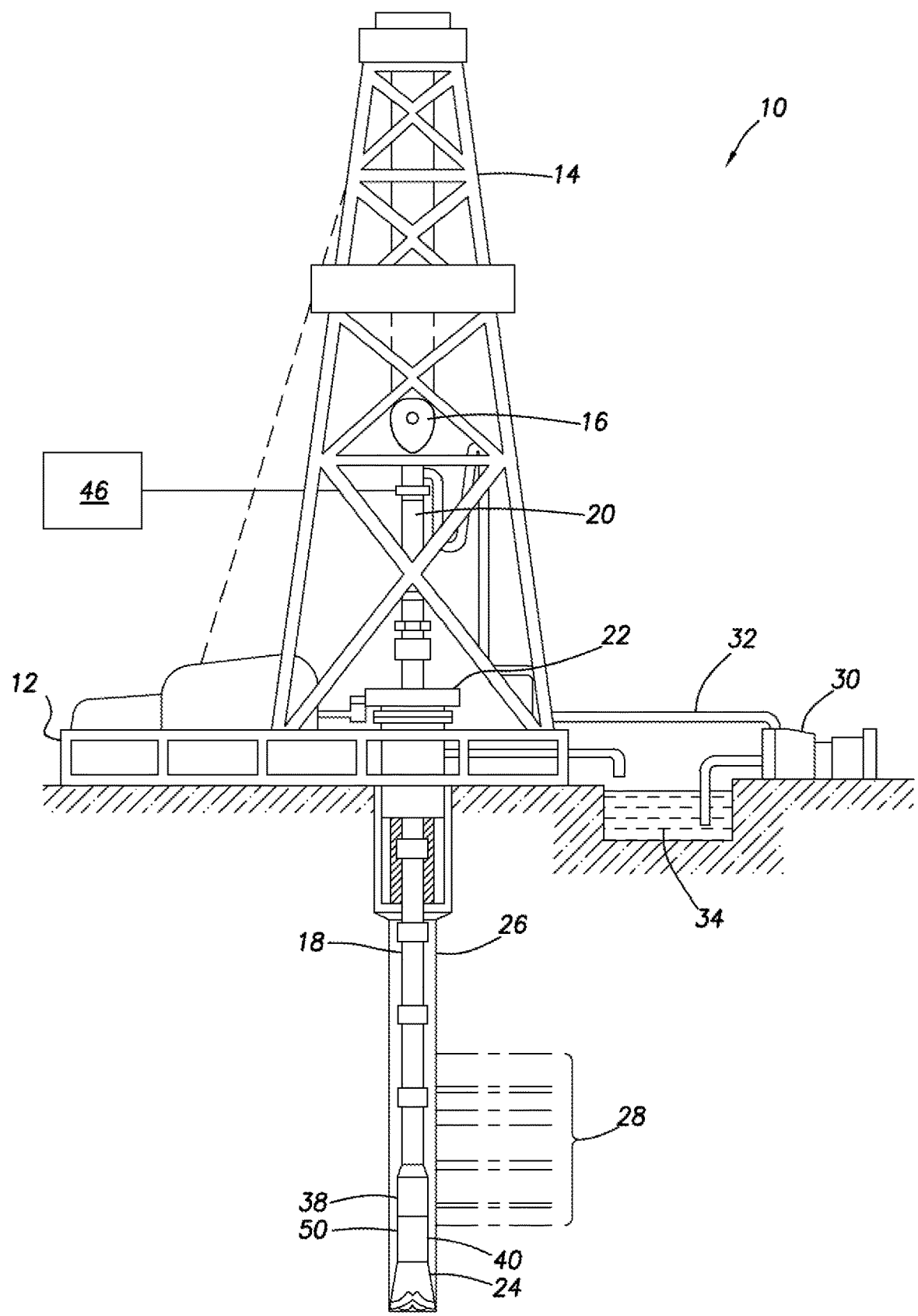
FIG. 1 is a representative partial cross-sectional view of a system for capturing subsurface measurement data in a logging while drilling (LWD) operation with an antenna, according to one or more example embodiments.

The disclosure may repeat reference numerals and/or letters in the various examples or Figures. This repetition is for the purpose of simplicity and clarity and does not in itself dictate a relationship between the various embodiments and/or configurations discussed.

Moreover even though a Figure may depict a horizontal wellbore or a vertical wellbore, unless indicated otherwise, it should be understood by those skilled in the art that the apparatus according to the present disclosure is equally well suited for use in wellbores having other orientations including vertical wellbores, slanted wellbores, multilateral wellbores or the like. Likewise, unless otherwise noted, even though a Figure may depict an offshore operation, it should be understood by those skilled in the art that the method and/or system according to the present disclosure is equally well suited for use in onshore operations and vice-versa. Further, unless otherwise noted, even though a Figure may depict a cased hole, it should be understood by those skilled in the art that the method and/or system according to the present disclosure is equally well suited for use in open hole operations.

This disclosure relates in part to any of a variety of tools, systems, and methods to evaluate an environment surrounding a wellbore. A tool may include, for example, a body with an antenna mounted thereon. The antenna may include a ferrite assembly and a coil assembly. The coil assembly may be mounted radially outward from the ferrite assembly, where the coil assembly can transmit electromagnetic signals into the environment and/or receive the electromagnetic signals from the environment, and where the electromagnetic signals can be evaluated to determine one or more parameters of the environment surrounding the wellbore. The tool may also include one or more grooves disposed in a wall of a sleeve of the ferrite assembly, and one or more ferrite objects installed in the grooves, which can have a cross-sectional shape that retains the ferrite objects in the groove. The ferrite objects can alter a trajectory of one or more of the electromagnetic signals.

FIG. 1 is a representative illustration of an example logging while drilling (LWD) environment. A well system 10 can include a drilling platform 12 equipped with a derrick 14 that supports a hoist 16 for raising and lowering a drill string 18. The hoist 16 suspends a top drive 20 suitable for rotating the drill string 18 and lowering the drill string 18 through the well head 22. Connected to the lower end of the drill string 18 can be a drill bit 24. As the drill bit 24 rotates, it creates a wellbore 26 that passes through various formations 28. A pump 30 can be used to circulate drilling fluid through a supply pipe 32 to top drive 20, down through the interior of drill string 18, through orifices in drill bit 24, back to the surface via an annulus around drill string 18, and into a retention pit 34. The drilling fluid transports cuttings from the wellbore 26 into the pit 34 and aids in maintaining the integrity of the wellbore 26. Various materials can be used for drilling fluid, including a salt-water based conductive mud.

An assembly of downhole tools 50 (such as LWD tools), which can include one or more antennas 40, can be integrated into a bottom-hole assembly (BHA) near the bit 24. As the bit 24 extends the wellbore 26 through the formations 28, tools 50 can collect measurements relating to various formation properties as well as the tool orientation and various other drilling conditions. The tools 50 can take the form of a drill collar, i.e., a thick-walled tubular that provides weight and rigidity to aid the drilling process. In various examples, the tools 50 can include one or more antennas 40 for injecting electromagnetic signals into the formations 28 and/or receiving electromagnetic signals from the formations 28 to measure and deliver logging data, such as parameters of an environment (such as formations 28) surrounding of the wellbore 26. A telemetry sub 38 can be included to transfer images and measurement data to a surface receiver and to receive commands from the surface. In some embodiments, the telemetry sub 38 does not communicate with the surface, but rather stores logging data for later retrieval at the surface when the logging assembly is recovered.

Figure 2:
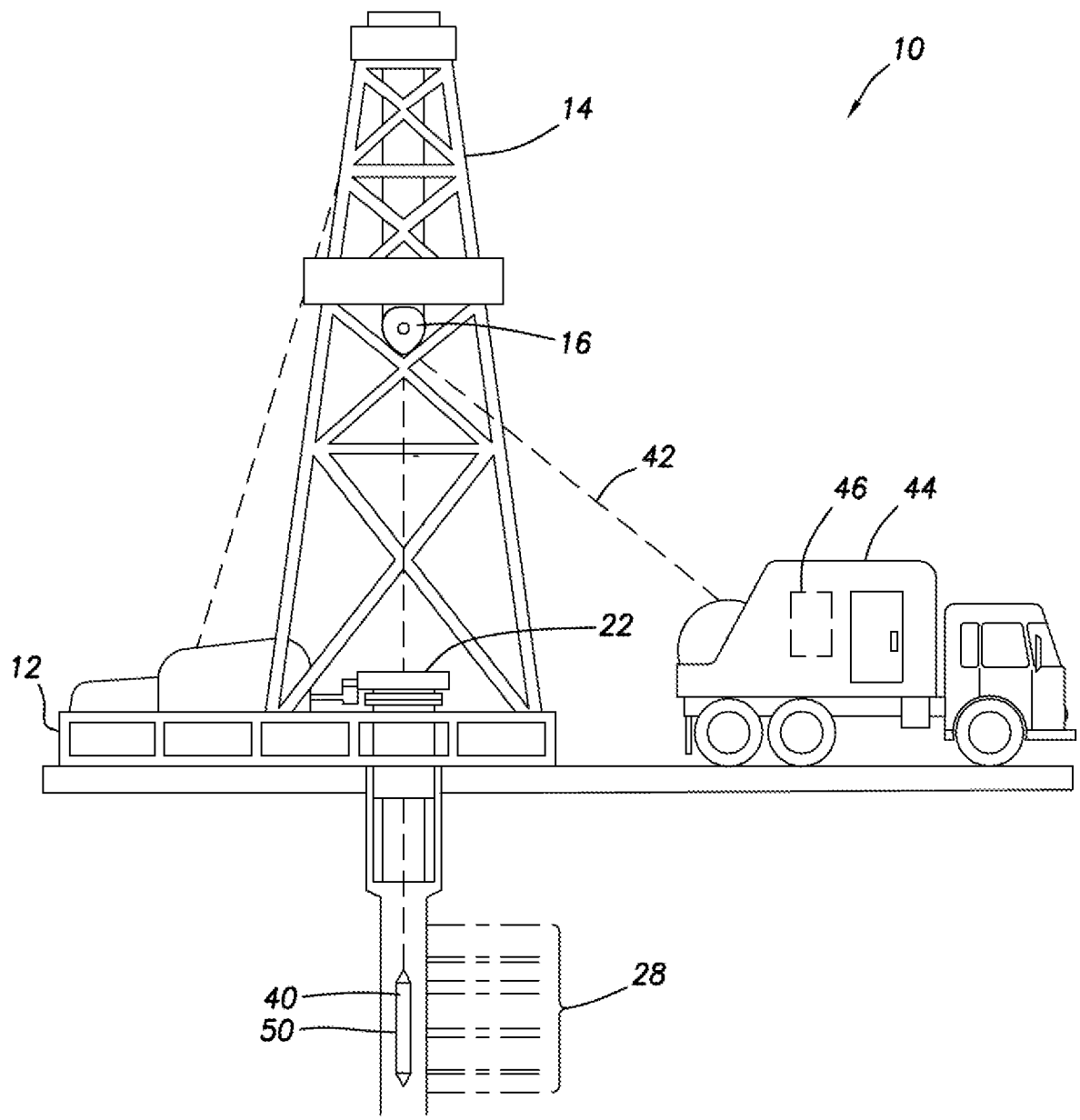
FIG. 2 is a representative partial cross-sectional view of a system for capturing subsurface measurement data in a wireline logging operation with an antenna, according to one or more example embodiments.

At various times during (or after) the drilling process, the drill string 18 can be removed from the wellbore 26 as shown in FIG. 2. Once the drill string 18 has been removed, logging operations can be conducted using a downhole tool 50, such as a wireline logging tool, which can be a probe suspended by a cable 42 having conductors for conducting power to the tool 50, and for transmitting telemetry data from the tool 50 to the surface equipment. The tool 50 can have pads and/or centralizing springs to maintain the tool 50 near the central axis of the wellbore 26 as tool 50 is pulled uphole. Again, the tool 50 can include a variety of antennas 40 for measuring formation parameters (e.g. resistivity), ranging parameters, etc., and providing the measurement data to a remote location in the wellbore 26 or other equipment at the surface. A logging facility 44 can collect measurements from the tool 50, and can include one or more processors 46 for processing and storing the measurements gathered by the tool 50.

Figure 3:
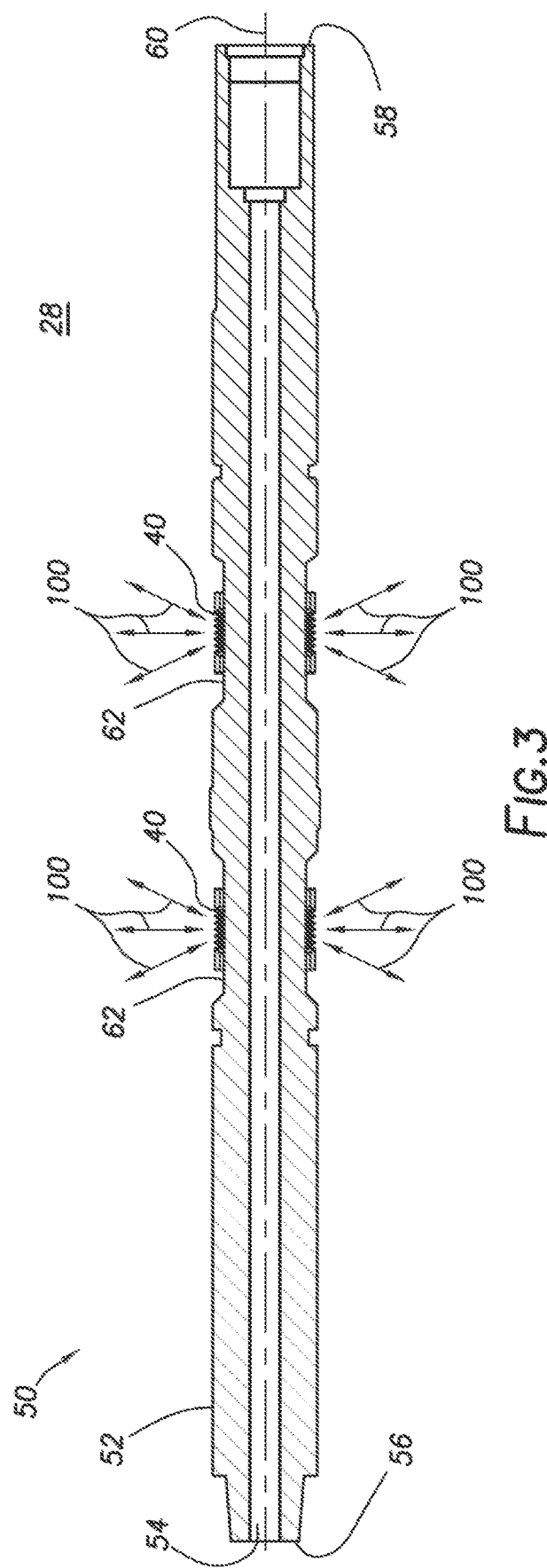
FIG. 3 is cross-sectional view of a downhole tool that can benefit from the principles of this disclosure, according to one or more embodiments.

FIG. 3 shows representative cross-sectional view of an example downhole tool 50 in the form of a drill collar. The tool 50 can be interconnected in a drill string 18 by connecting the ends 56, 58 to adjacent segments of drill pipe or other downhole tools. The tool 50 may include a central axis 60, a body 52, and an interior flow passage 54 that extends through the tool 50. One or more antennas 40 are carried by body 52. In the illustrated embodiment, an antenna 40 is shown disposed in a recess 62 formed in body 52. These recesses 62 can help protect the antennas 40 while the tool 50 is installed and rotated in the wellbore 26. The antennas 40 can be coil-type antennas, where a conductor is helically wrapped around a body of the antenna 40. In this configuration, one antenna 40 can be used to transmit electromagnetic signals 100 into the formations 28 while the other antenna 40 is used to receive electromagnetic signals 100 from the formations 28. However, if should be understood that more or fewer antennas 40 can be included in the tool 50, and that the antennas 40 can be used to transmit and/or receive electromagnetic signals between the formations 28 and the antennas 40.

During transmission of the electromagnetic signals 100 into the formations 28, it may be desirable to limit or minimize the amount of the electromagnetic signals directed towards the interior of body 52 of the tool 50. Electromagnetic signals propagated into or through the body 52 may be inhibited from entering the formations 28. Therefore, this can reduce the efficiency of the tool 50 by reducing at depth of penetration into the formations 28 by the electromagnetic signals 100. The antenna 40 of the current disclosure utilizes ferrite objects to direct the electromagnetic signals 100 radially and/or angularly away from the tool 50, thereby limiting electromagnetic signals that might enter the body 52.

Figure 4:
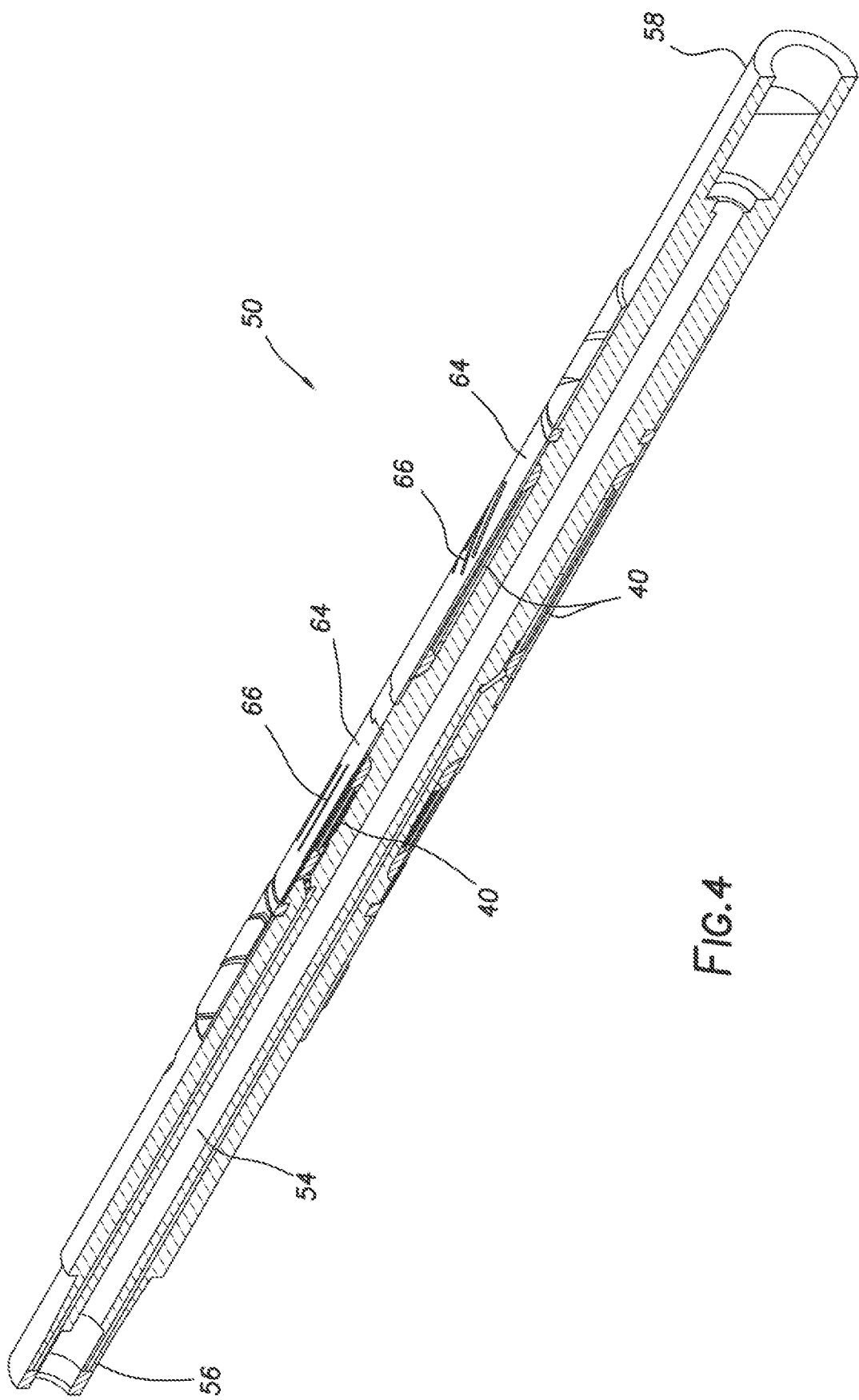
FIG. 4 is a representative perspective partial cross-sectional view of a downhole tool with coil antennas, according to one or more embodiments.

FIG. 4 is a representative cross-sectional view of another example of a downhole tool 50. In this example, the tool 50 is a drill collar with two antennas 40 disposed in respective recesses 62 in an exterior of a body 52 of the tool 50. Each antenna 40 can include a shroud 64 positioned over it. Each shroud 64 can include slots 66 to allow transmission of the electromagnetic signals 100 through the shroud 64, especially if the shroud 64 is made from a material with a low permeability to magnetic flux (e.g. steel, aluminum, etc.). The shroud can be made from a material with a high permeability to magnetic flux (e.g. non-magnetic material, composites, etc.), in which case the slots 66 may not be needed. It should also be understood that some embodiments do not use a shroud at all, depending upon the design of the antenna 40 and how it is mounted to the tool 50.

Figure 5:
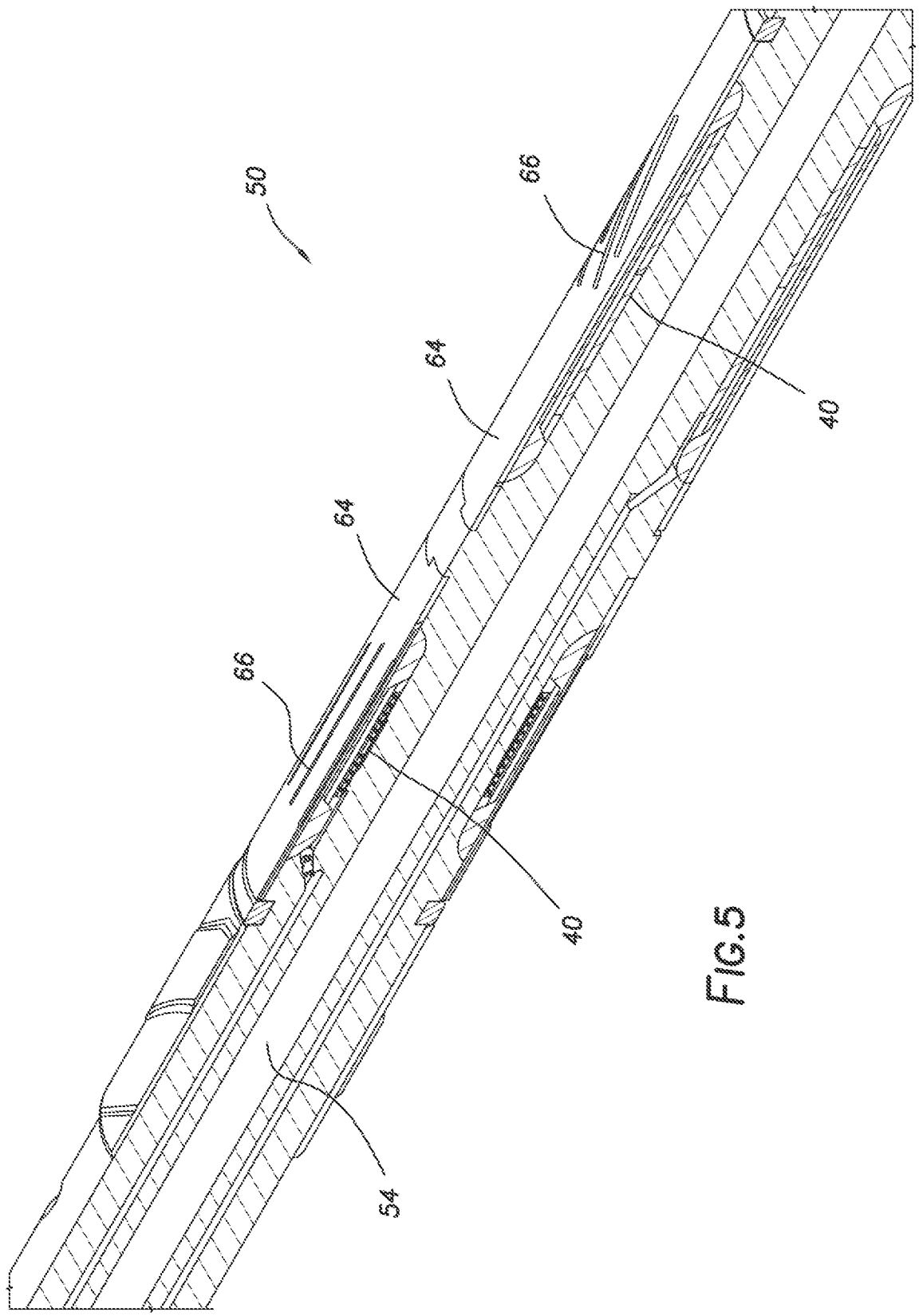
FIG. 5 is a representative perspective partial cross-sectional view of the downhole tool of FIG. 4 with coil antennas, according to one or more embodiments.

FIG. 5 is a more detailed representative cross-sectional view of the antenna portion of the downhole tool 50 shown in FIG. 4. In this example, the antenna 40 is an annular antenna carried on an outer surface of the tool body 52, and is positioned between the tool body 52 and the shroud 64. The lower antenna 40 may be configured differently than the upper antenna 40. In this embodiment, the lower antenna 40 has spiraled slots 66, while the upper antenna has longitudinal slots 66. Also, the lower antenna 40 is longer than the upper antenna 40 and has various other configuration differences. The following figures may focus on the configuration of the upper antenna 40, but it should be understood that the elements of the upper antenna 40 can be applied alone or in combination with other antenna configurations, such as the lower antenna 40 of FIG. 5 and the antennas of FIGS. 1 and 2.

Figure 6:
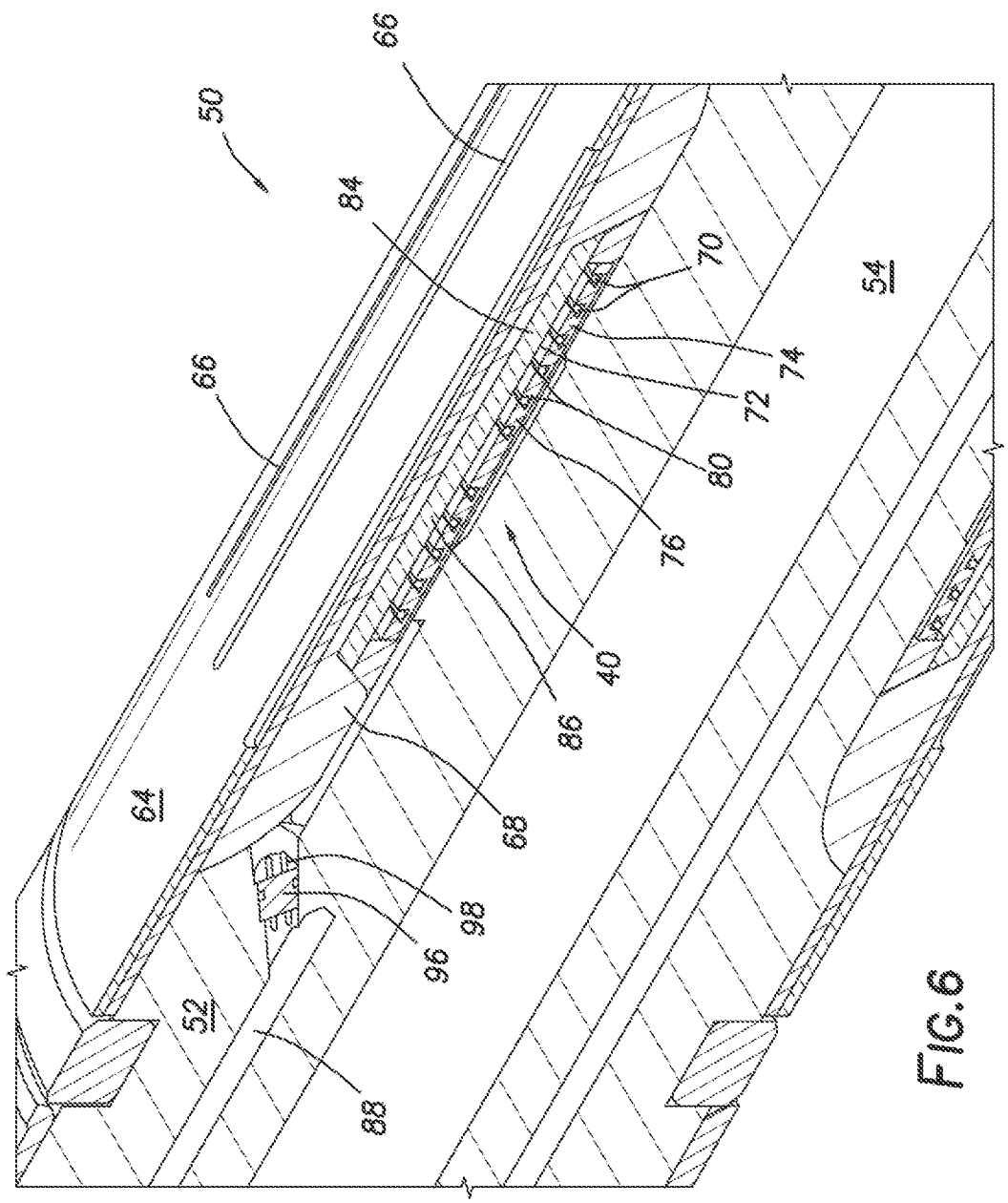
FIG. 6 is a representative perspective partial cross-sectional view of an antenna portion of the downhole tool of FIG. 4, according to one or more embodiments.

FIG. 6 is a more detailed representative cross-sectional view of the an antenna 40 such as is shown in FIG. 5. In this example, the shroud 64 is disposed on the body 52, and positioned radially outward from the antenna 40. An annular space is shown between the antenna 40 and the shroud 64 which can be filled with a non-magnetic material 68. The antenna 40 can include a coil assembly 86 and a ferrite assembly 76, with the coil assembly positioned radially between the shroud 64 and the ferrite assembly 76. In embodiments without an outer shroud 64, ferrite assembly 76 is simply positioned radially inward from the coil assembly 86. Although the disclosure is not limited to a particular type of coil assembly or arrangement, in the illustrated embodiment, the coil assembly 86 can include a conductor that may be helically wrapped around a coil sleeve 84 to produce a coil antenna. Ends of the conductor can be connected to the connector 96 via connector pins 98, with conductors extending through the channel 88 to couple the connector 96 to remote equipment, such as surface equipment, other downhole tools, etc. The ferrite assembly 76 can include a sleeve 74 with one or more grooves 80 disposed in the sleeve 74. Each groove 80 can be filled with ferrite objects 70 that resist transmission of the electromagnetic signals 100 through the ferrite assembly 76 and thereby resist transmission of the electromagnetic signals 100 into the tool body 52. The spacing and pattern of the grooves 80 in the ferrite assembly 76 can be modified, as well as the geometries of the ferrite objects 70, to tailor the ferrite assembly 76 for various types of electromagnetic signal 100. In one or more embodiments, the grooves are shaped to have a larger cavity formed radially inward of the groove opening at the base of the groove, permitting the groove to retain ferrite objects 70 within the cavity of the groove.

Figure 7:
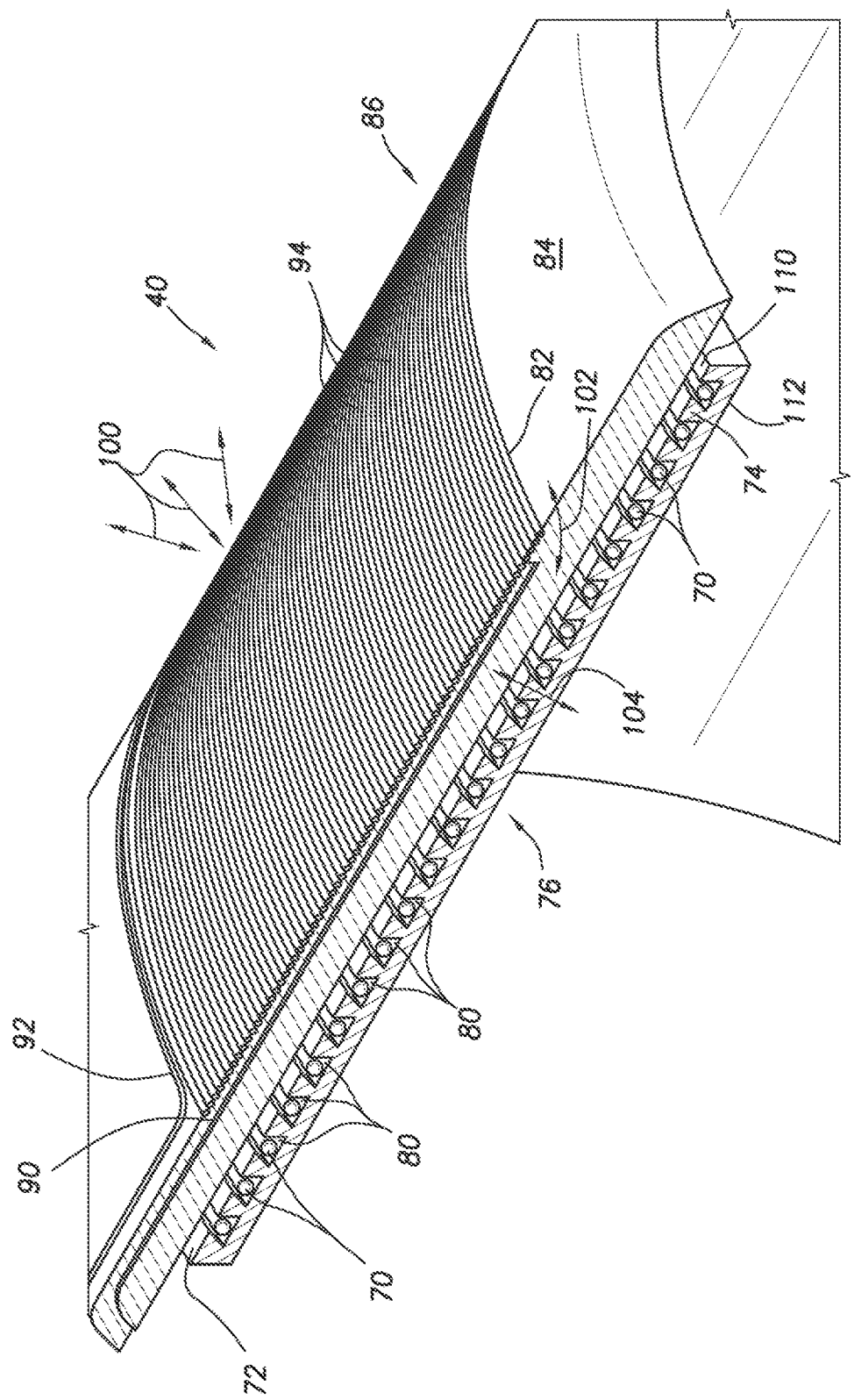
FIG. 7 is a representative perspective partial cross-sectional view of an antenna assembly, according to one or more embodiments.

FIG. 7 is a representative cross-sectional view of the antenna 40 without the surrounding elements shown (i.e. the tool body 52, shroud 64, etc.) for clarity. The coil assembly 86 includes a cylindrical sleeve 84 with one or more conductor grooves 82 formed in sleeve 84. In some embodiments, the conductor grooves 82 can form a path around the cylindrical sleeve 84 into which a conductor 94 can be placed. The conductor 94 can transmit electromagnetic signals 100 when current is driven through the conductor 94, and the conductor 94 can receive electromagnetic signals 100 when current is induced in the conductor 94 by the electromagnetic signals 100. The electromagnetic signals can be transmitted and/or received from any direction surrounding the antenna 40, as indicated by the signals 100, 102, 104. They may travel to/from the surrounding environment and the coil assembly 86, such as electromagnetic signals 100. They may travel to/from the interior of the tool 50 and the inner surfaces of the coil assembly 86, such as electromagnetic signals 104. It can be desirable to limit the amount of electromagnetic signals 104 that propagate to the interior of the tool body 52, to increase efficiency of the antenna 40. Therefore, it can be desirable to install the ferrite assembly 76 radially inward of the coil assembly 86, where the ferrite objects 70 positioned in the grooves 80 can redirect the electromagnetic signals, such as electromagnetic signals 102, altering their path trajectory (e.g. signals 104) to/from the surrounding environment without traveling into the interior of the tool body 52.

Figure 8:
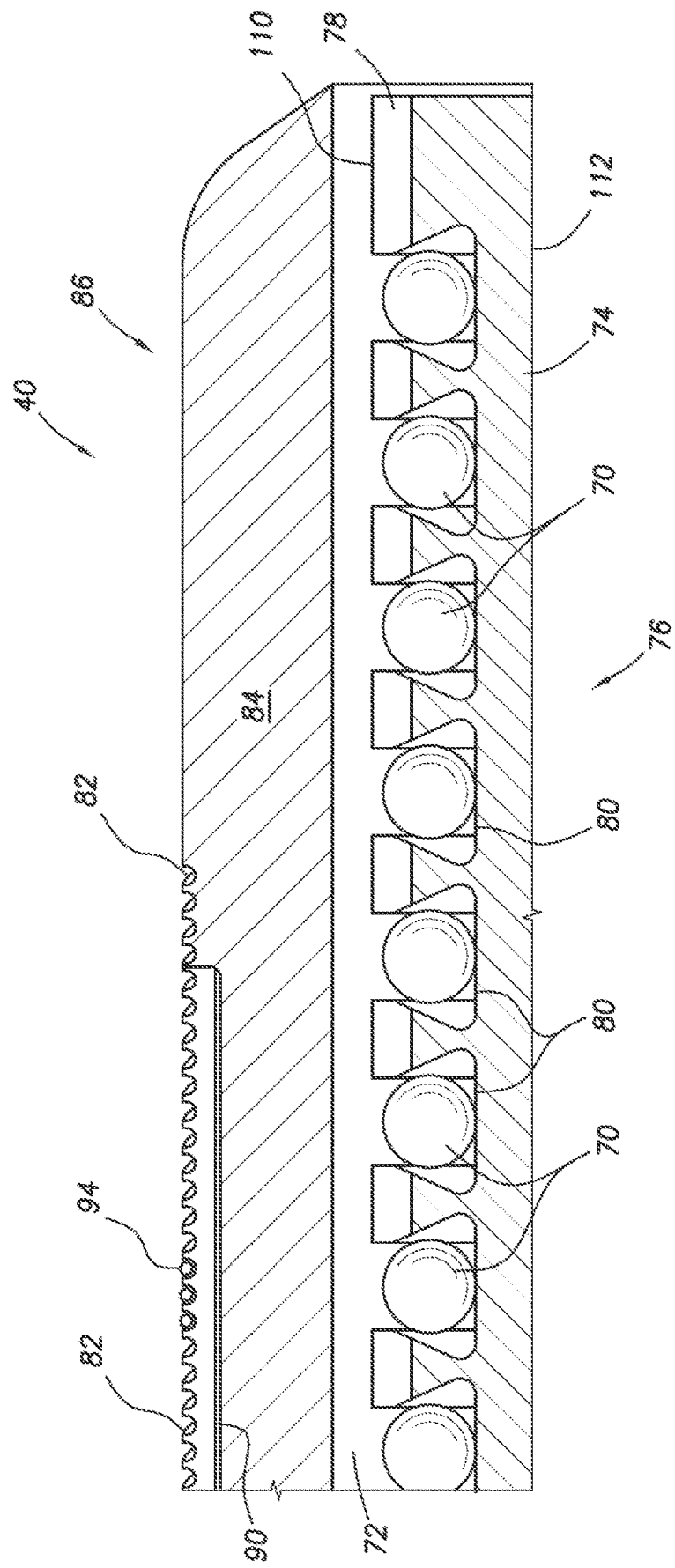
FIG. 8 is a representative partial cross-sectional view of an antenna assembly, according to one or more embodiments.

FIG. 8 is a representative cross-sectional view of a portion of the antenna 40 with the ferrite assembly 76 installed radially inward of the coil assembly 86, such as in FIG. 7. As shown, the grooves 80 are characterized by a groove opening with a cavity formed radially inward of the groove opening, where the cavity has a larger cross-section near the base of the groove than the groove opening. Although the cavity may take any shape and the disclosure is not limited in this regard, in the illustrated embodiment, the groove is dovetail in shape. In any event, the shaped groove as described herein can be used to retain the ferrite objects 70 (shown as spheres in this example) within the ferrite assembly 76. Once the ferrite objects 70 are installed in the grooves 80, a non-magnetic material can be used to hold the objects 70 within the grooves 80, such as an adhesive, polymers, fiberglass, resin, etc. A longitudinal groove 78 can be formed along a surface 110 of the sleeve 74 that transverses the grooves 80. The groove 78 allows for insertion of the ferrite objects 70 into each groove 80 at the intersection of the groove 80 and the longitudinal groove 78, at least in this example. The ferrite assembly 76 can be installed within the coil assembly 86 (i.e. radially inward from the coil assembly 86), and positioned on the tool body 52. A non-magnetic material can be used to file an annulus 72 between the ferrite assembly 76 and the coil assembly 86. The coil assembly 86, mentioned above, can include a cylindrical sleeve 84 with conductor grooves 82, into which the conductor 94 can be installed to form a coil antenna assembly 86. The first end 90 of the conductor 94 is also shown being routed from one end of the conductor 94 coil to the connector 96 (not shown in this figure). It should be understood that this is only one of many possible configurations of using ferrite objects to resist electromagnetic signals from traveling into a body of a downhole tool, such as tool body 52.

FIGS. 9A-9F show various configurations of the grooves 80 (e.g. groves 80a-h) and ferrite objects 70 (e.g. objects 70a-h). The antenna 40 is similar to the antenna shown in FIGS. 7 and 8, with the conductor 94 installed in the conductor groove 82 formed in the sleeve 84. The ferrite assembly 76 is installed within the coil assembly 86, with the annular gap 72 possibly filled with a non-magnetic material for securing the objects within the grooves 80 and the ferrite assembly 76 within the coil assembly 86. Any of the grooves 80a-h shown in FIG. 9A can be used in combination with any other of the other grooves 80a-h. It may be desirable to form like grooves in the sleeve 74, but having the same type of groove formed in the sleeve 74 of the ferrite assembly is not a requirement for the antenna 40. Each groove 80a-h has some similar characteristics, such as the width of the groove at a surface 110, 112 of the sleeve 74, such as width L1 of groove 80a, is narrower relative to the largest width of the groove below the surface 110, such as L2 of groove 80a. Additionally, the width of the ferrite object 70, such as diameter D1 of object 70a, is larger than the width of the groove at the surface 110, such as width L1, and smaller than the largest width of the groove below the surface 110, such as width L2 of groove 80a and diameter D4 of groove 80d. These geometries allow the grooves 80a-h to retain the ferrite objects 70a-h, respectively, while the objects are being installed into the respective grooves 80a-h. It should be understood that these geometries can include a groove 80g that has a lower portion with a triangularly shaped cross-section and an upper portion with a rectangularly-shaped cross-section to form the groove 80g with the cross-section shown in FIG. 9A.

Figure 9A:
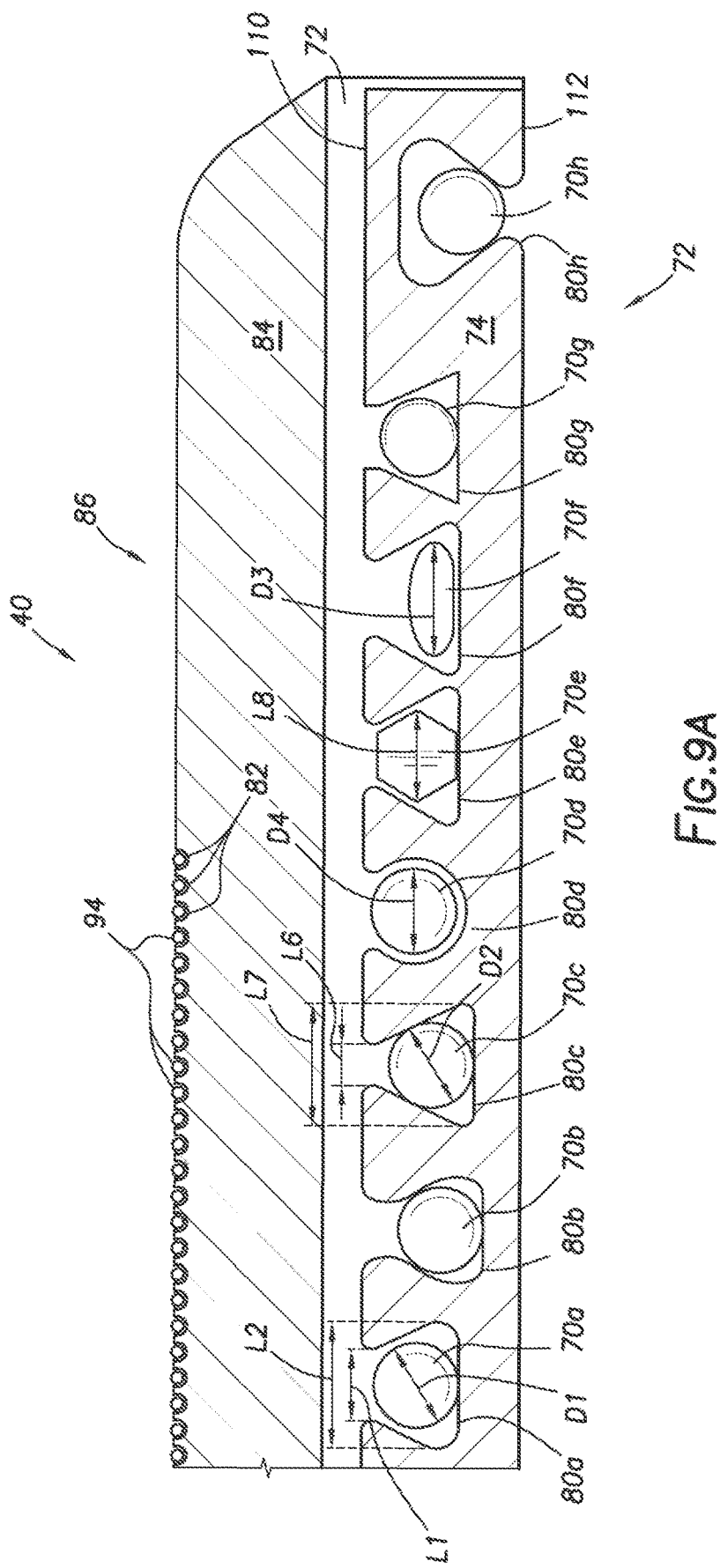
FIG. 9A is a representative partial cross-sectional view of an antenna assembly with representative ferrite objects retained in the assembly, according to one or more embodiments.
Figure 9D:
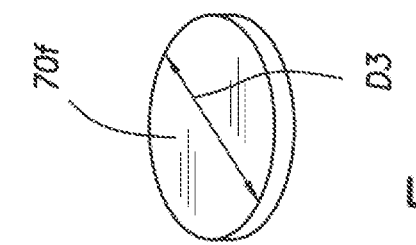
FIGS. 9B-9F are representative perspective views of various ferrite objects that can be used in an antenna assembly, according to one or more embodiments.
Figure 9F:
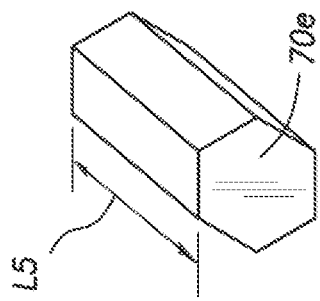
Figure 9C:
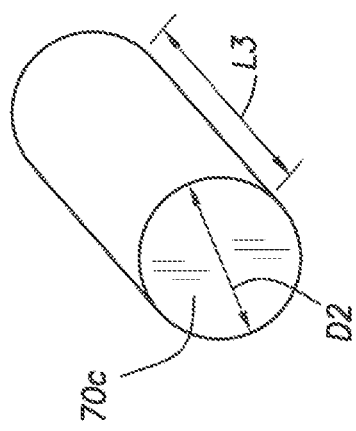
Figure 9B:
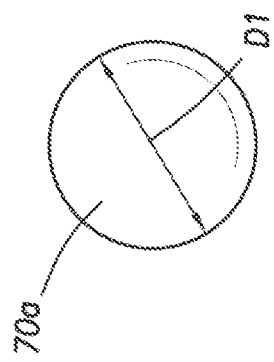
Figure 9E:
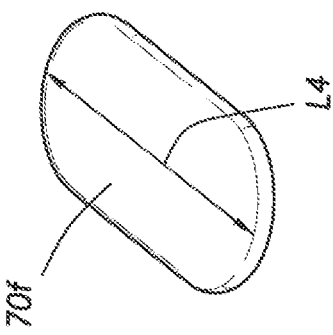

Grooves 80a, 80e, 80f, and 80h can be seen as grooves with a dovetail cross-section, as shown in FIG. 8. This illustrates that multiple types of ferrite objects can be installed in the same type of groove 80, such as these grooves 80a, 80e, 80f, and 80h. For example, any of the ferrite objects shown in FIGS. 9B-9F can be installed in any of the grooves 80a-h. The ferrite object 70a is shown as a sphere with a diameter D1 in FIG. 9B. The sphere 70a can be installed in any of the grooves 80a-h, as long as the diameter D1 is greater than the width of the opening of the groove at the surface 110, 112 (e.g. widths L2, L6). The ferrite objects 70b, 70d, 70g, and 70h are also shown to as spheres in FIG. 9A. The ferrite object 70c is shown as a cylindrically shaped rod with a diameter D2 and a length L3 in FIG. 9C. The ferrite object 70c can be installed in any of the grooves 80a-h, as long as the diameter D2 is greater than the width of the opening of the groove at the surface 110, 112, and the length is compatible with the longitudinal and/or circumferential grooves. The ferrite object 70e is shown as a polygon shaped rod with a width L8 and a length L5 in FIG. 9F. The polygon object 70e can be installed in any of the grooves 80a-h, as long as the width L8 is greater than the width of the opening of the groove at the surface 110, 112. The ferrite object 70f is shown in FIGS. 9D and 9E as a button shaped object with a diameter D3, if the object 70f is circular (FIG. 9D), or a width D3 with a length L4, if the button is oblong (FIG. 9E), elongated, or elliptically shaped. The button object 70f can be installed in any of the grooves 80a-h, as long as the diameter (or width) D3 is greater than the width of the opening of the groove at the surface 110, 112. It should be understood that, as seen in FIG. 9A, the grooves 80a-h can be formed in the surface 110, which is shown as an exterior surface of the sleeve 74, and/or the surface 112, which is shown as an interior surface of the sleeve 74, in this example. If the sleeve 74 is thick enough, then grooves 80 can be formed in both the exterior and interior surfaces 110, 112, with grooves 80 being at least partially filled with ferrite objects 70. It should be understood, that it is not a requirement that ferrite objects fill or partially fill one or more of the grooves 80. One or more grooves 80 can be left empty of any ferrite objects 70, if so desired, to tailor the antenna performance.

Figure 10:
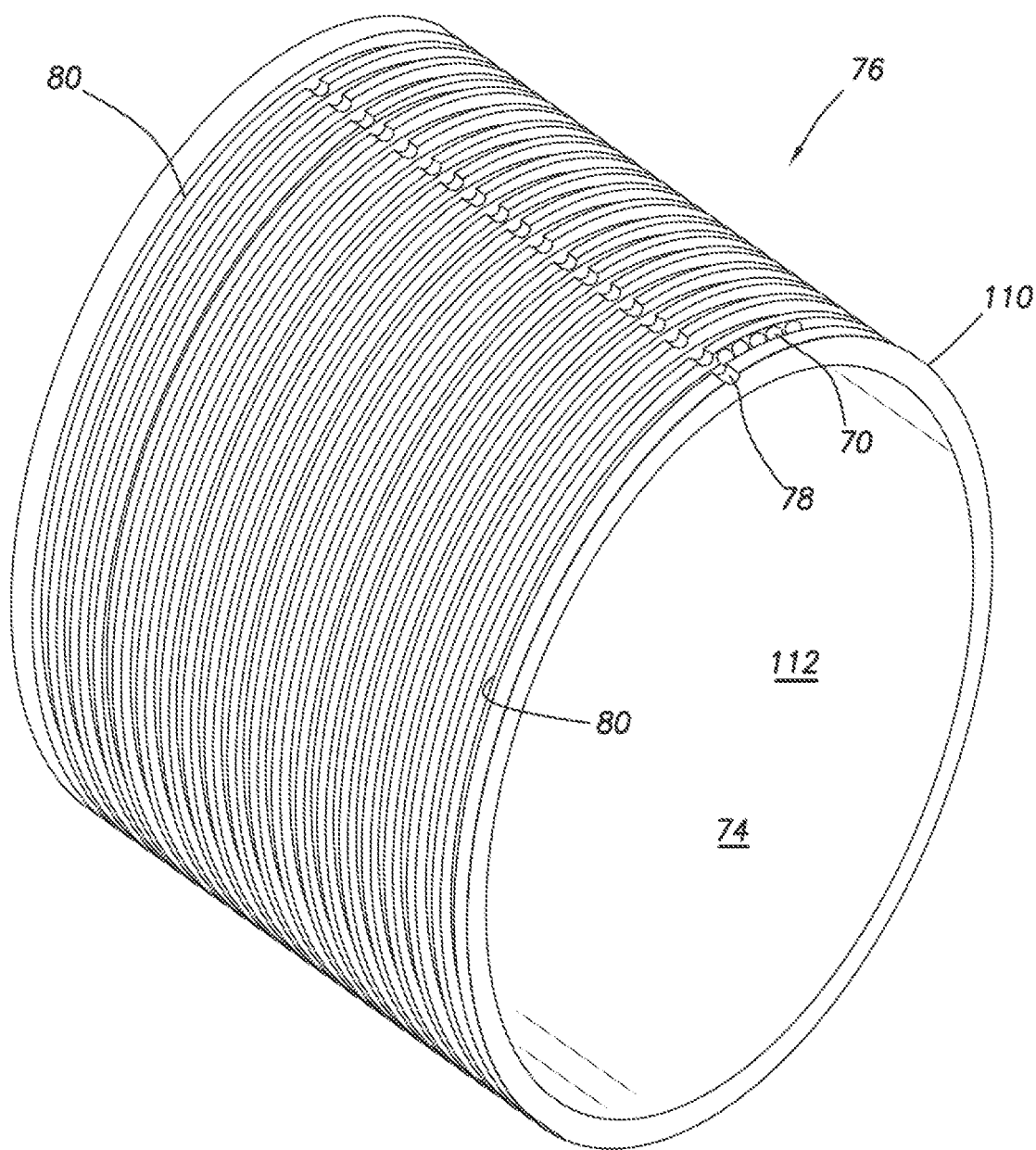
FIGS. 10-14B are various perspective and partial cross-sectional views of example ferrite assemblies that can be used in an antenna assembly, according to one or more embodiments.
Figure 11:
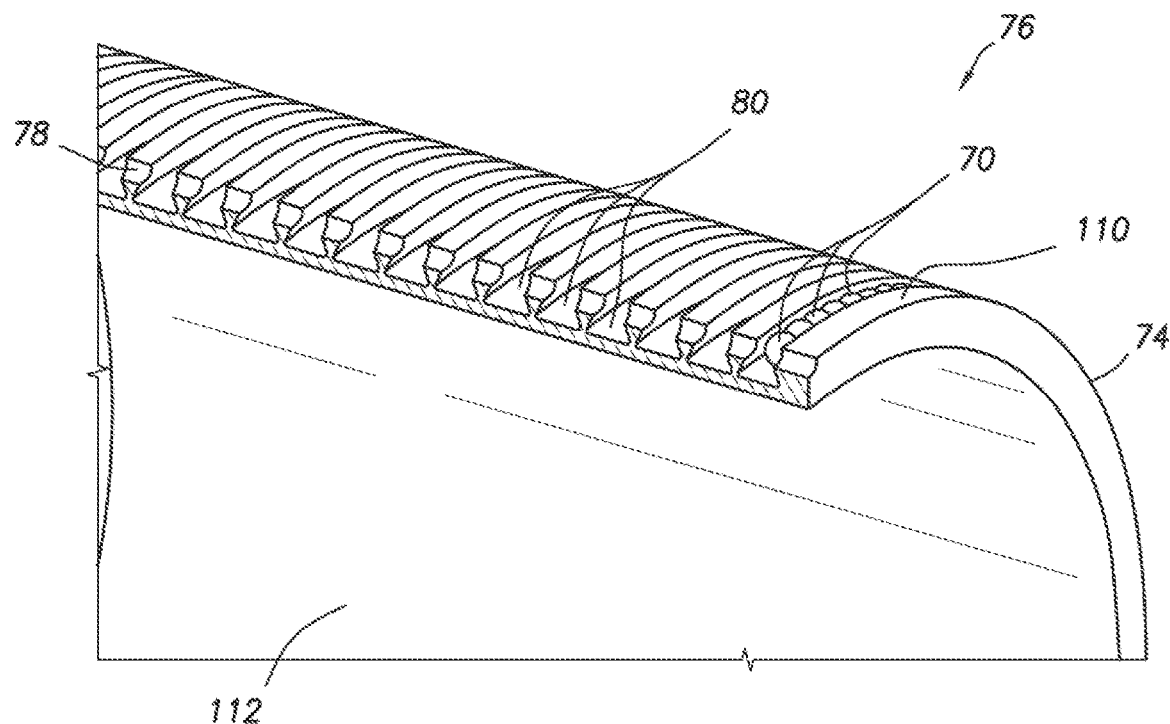
Figure 12:
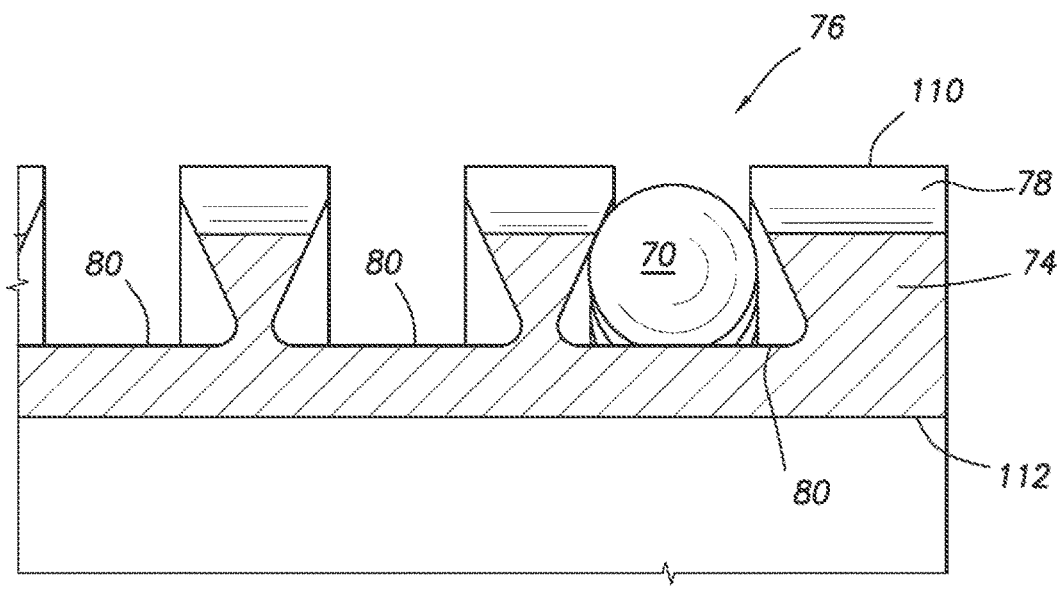

FIGS. 10-14B show various representative perspective and cross-sectional views of examples of ferrite assemblies 76. FIG. 10 shows a sleeve 74 with circumferential grooves 80 formed through the exterior surface 110 of the sleeve 74. A longitudinal groove 78 can be cut longitudinally across the grooves 80 to provide access to install the ferrite objects 70 into the grooves 80. FIG. 11 shows a more detailed view of a region of the ferrite assembly 76 of FIG. 10, with ferrite objects 70, (e.g., spheres in this example) installed in at least one of the grooves 80. FIG. 12 shows a detailed cross-section of the region of FIG. 10, with ferrite objects installed in one of the grooves 80. The remainder of the grooves 80 can be filled with the ferrite objects, or left unfilled, as desired.

Figure 13B:
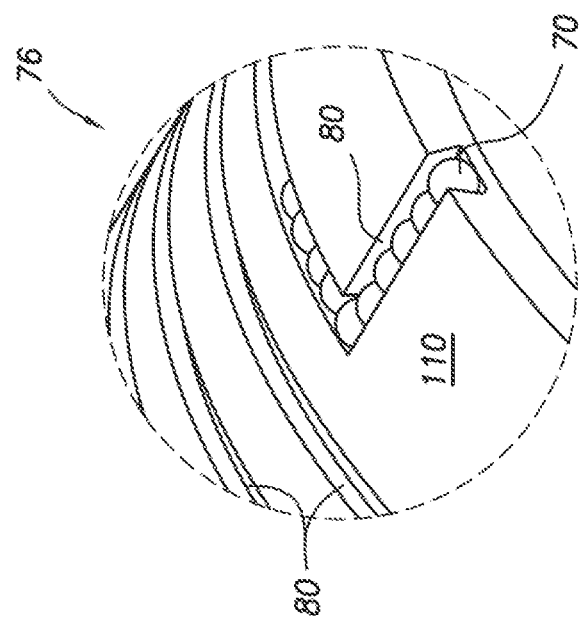
Figure 13A:
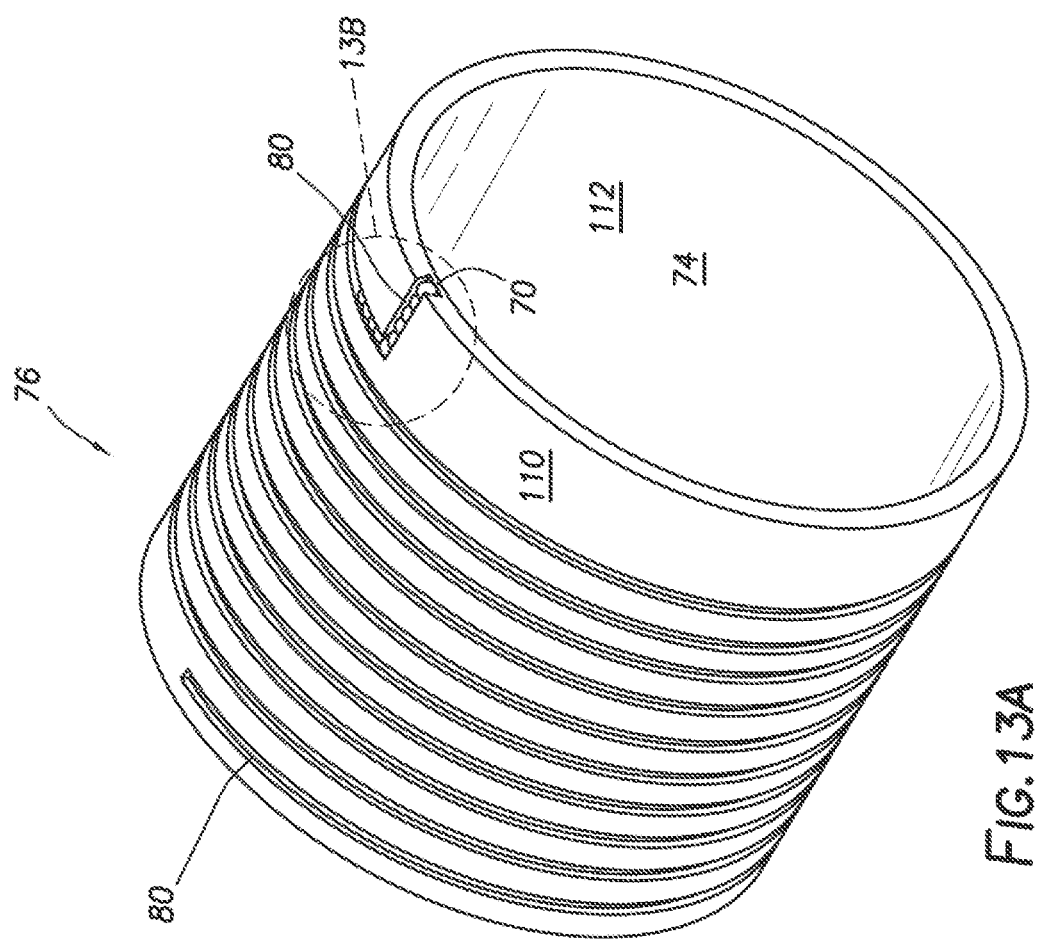

FIG. 13 shows a representative perspective view of a ferrite assembly 76 with a single groove 80 formed around the sleeve 74. One end of the formed groove 80 is terminated into the sleeve 74, with the other end formed at substantially a right angle to the groove, to facilitate installation of the ferrite objects 70. It should be clear that other terminations of the ends of the groove 80 are possible, in keeping with the principles of this disclosure. The detailed view of the region shows how the ferrite objects can be installed in the groove 80.

Figure 14B:
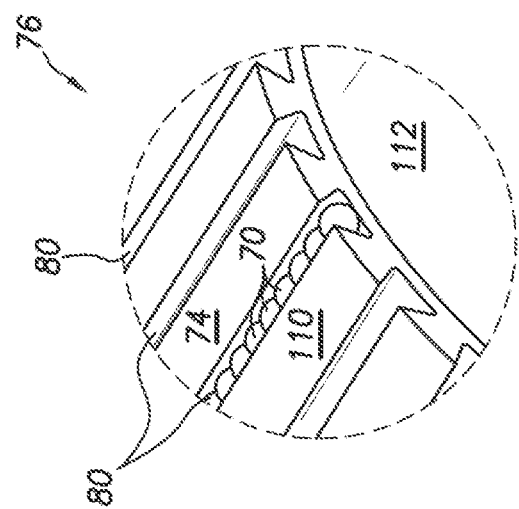
Figure 14A:
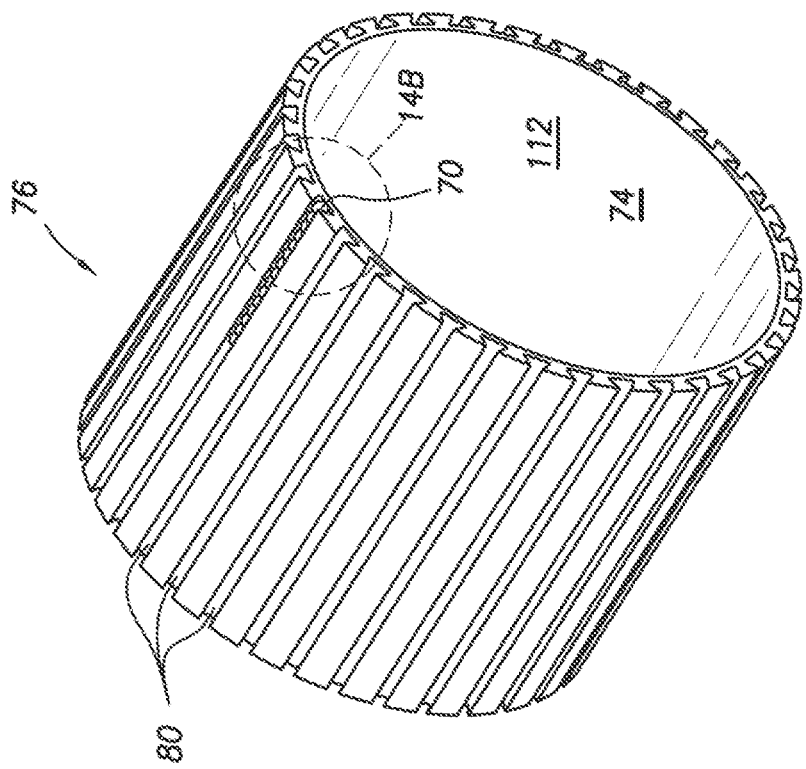

FIGS. 14A and 14B show a representative perspective view of a ferrite assembly 76 with multiple longitudinal grooves 80 formed through the surface 110 of the sleeve 74, and spaced circumferentially around the sleeve 74. The detailed view of the region shows how the ferrite objects can be installed in the longitudinal grooves 80.

A downhole tool for evaluating an environment surrounding a wellbore is provided. The tool can include a body, an antenna mounted on the body, the antenna comprising a ferrite assembly and a coil assembly, with the ferrite assembly positioned between the coil assembly and the body. The antenna can transmit electromagnetic signals into the environment and/or receive the electromagnetic signals from the environment. These electromagnetic signals can be evaluated to determine one or more parameters of the environment surrounding the wellbore. The ferrite assembly can include a sleeve with a groove disposed in a wall of the sleeve and one or more ferrite objects installed in the groove. The groove can have a cross-sectional shape that retains the ferrite objects in the groove, and the ferrite objects can alter a trajectory of one or more of the electromagnetic signals.

For any of the foregoing embodiments, the tool may include any one of the following elements, alone or in combination with each other:

The tool can be a wireline logging tool, a bottom hole assembly, a drill collar, a logging while drilling tool, a measuring while drilling tool, and a formation parameter measurement tool.

The groove can include a cross-sectional shape of a dovetail shape, a triangular shape, a tear drop shape, or a circular shape. The ferrite objects can be spherically shaped balls, button shaped discs, elongated button shaped discs, elliptically shaped discs, cylindrically shaped rods, and/or polygon shaped rods. The groove can be recessed into the wall from an exterior surface of the sleeve, where the exterior surface faces the antenna or faces away from the antenna. The sleeve can include a non-magnetic material.

Ferrite objects installed in the groove can extend helically around the sleeve, and/or longitudinally along the sleeve. The groove can include a plurality of grooves, where the ferrite objects installed in each groove can extend circumferentially around the sleeve with each groove longitudinally spaced apart along the sleeve. The ferrite objects installed in each groove can extend longitudinally along the sleeve with each groove circumferentially spaced apart. The ferrite objects installed in each groove can extend longitudinally and circumferentially about the sleeve and each groove can be spaced apart from an adjacent groove. The ferrite objects installed in the groove (or grooves) can resist transmission of the electromagnetic signals into the body of the tool.

A system for evaluating an environment surrounding a wellbore is provided. The system can include a downhole tool connected to a conveyance, which can convey the downhole tool into the wellbore. The downhole tool can include a body, an antenna mounted on the body, the antenna comprising a ferrite assembly and a coil assembly, with the ferrite assembly positioned between the coil assembly and the body. The antenna can transmit electromagnetic signals into the environment and/or receive the electromagnetic signals from the environment.

For any of the foregoing embodiments, the system may include any one of the following elements, alone or in combination with each other:

The electromagnetic signals can be evaluated to determine one or more parameters of the environment surrounding the wellbore, where the parameters can be a ranging parameter, a permeability parameter, a resistivity parameter, and a fluid velocity parameter.

The ferrite assembly can include a sleeve with a groove disposed in a wall of the sleeve and one or more ferrite objects installed in the groove. The groove can have a cross-sectional shape that retains the ferrite objects in the groove, where the ferrite objects can alter a trajectory of one or more of the electromagnetic signals. The cross-sectional shape can be a dovetail shape, a triangular shape, a tear drop shape, and a circular shape The conveyance can be selected from a group consisting of a wireline, coiled tubing, a segmented tubing string, a drill string, and an injection string. The ferrite objects can be spherically shaped balls, button shaped discs, elongated button shaped discs, elliptically shaped discs, cylindrically shaped rods, and/or polygon shaped rods. The groove can extend helically around the sleeve, longitudinally along the sleeve, or variations of circumferentially around and longitudinally along the sleeve and each groove is spaced apart from an adjacent groove.

A method of evaluating an environment surrounding a wellbore is provided. The method can include the operations of forming a groove in a surface of a sleeve, installing and securing one or more ferrite objects in the groove, installing the sleeve over a body of a downhole tool, installing a coil assembly over the sleeve, connecting the downhole tool to a conveyance, conveying, via the conveyance, the downhole tool into the wellbore, transmitting and/or receiving electromagnetic signals between the coil assembly and an environment surrounding the wellbore, and directing the electromagnetic signals away from the body of the downhole tool in response to a placement of the ferrite objects in the sleeve.

An antenna assembly for a downhole tool is provided. The assembly can include a coil assembly carried by a body of the downhole tool, a ferrite assembly carried by the tool body and positioned radially inward of the coil assembly, where the ferrite assembly can include a non-magnetic sleeve in which a groove is defined and a plurality of ferrite objects retained within said groove. The groove can be formed along an outer and/or inner surface of the sleeve. The groove can be characterized by an opening of a first cross-sectional width and a cavity, radially inward of the opening, the cavity having a second cross-section width greater than the first width.

Another embodiment of an antenna assembly for a downhole tool having a tool body is provided. The antenna assembly can include a coil assembly carried by the tool body and disposed in an exterior recess of the tool body, a ferrite assembly carried by the tool body, where the ferrite assembly is positioned radially inward of the coil assembly and radially outward from the tool body, where the ferrite assembly comprises a non-magnetic first sleeve in which a first groove is defined and a plurality of ferrite objects are retained within the first groove by a shape of the first groove, where the shape comprises a cavity formed radially inward from an opening of the first groove, where the cavity is larger than the opening, and where a width of the ferrite objects are smaller than the cavity and larger than the opening.

The ferrite objects can be selected from a group consisting of spherically shaped balls, button shaped discs, elongated button shaped discs, elliptically shaped discs, cylindrically shaped rods, and polygon shaped rods. The coil assembly can include a second sleeve in which a second groove is defined, where the second groove extends helically around the second sleeve and a conductor is disposed in the second groove to form an antenna coil.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

The invention claimed is:

1. A downhole tool for evaluating an environment surrounding a wellbore, the tool comprising:
a body;
an electromagnetic antenna mounted on the body, the antenna comprising a coil assembly and a ferrite assembly positioned between the coil assembly and the body, the ferrite assembly including a cylindrical sleeve with a circumferential groove defined therein extending circumferentially around the sleeve; and
a plurality of non-elongated ferrite objects retained in the groove of the sleeve, the ferrite objects having a length compatible with the groove to be installed within the groove and traverse the groove circumferentially around the cylindrical sleeve, the ferrite objects configured to alter a trajectory of one or more of the electromagnetic signals, wherein the ferrite objects are selected from a group consisting of spherically shaped balls, button shaped discs, elliptically shaped discs, cylindrically shaped rods, and polygon shaped rods installed in an end-to-end arrangement along a length of the groove.

2. The tool of claim 1, wherein the cross-sectional shape is selected from a group consisting of a dovetail shape, a triangular shape, a tear drop shape, and a circular shape.

3. The tool of claim 1, wherein the groove is recessed into a wall of the sleeve of the ferrite assembly from an exterior surface of the sleeve, and wherein the exterior surface faces the antenna.

4. The tool of claim 1, wherein the groove is recessed into a wall of the sleeve of the ferrite assembly from an interior surface of the sleeve, and wherein the interior surface faces away from the antenna.

5. The tool of claim 1, wherein the sleeve comprises a non-magnetic material.

6. The tool of claim 1, wherein the ferrite objects installed in the groove extend helically around the sleeve.

7. The tool of claim 1, wherein the groove includes a plurality of grooves, and wherein the ferrite objects installed in each groove extend circumferentially around the sleeve and each groove is longitudinally spaced apart along the sleeve.

8. The tool of claim 1, wherein the groove includes a plurality of grooves, and wherein the ferrite objects installed in each groove extend longitudinally and circumferentially about the sleeve and each groove is spaced apart from an adjacent groove.

9. The tool of claim 1, wherein the ferrite objects installed in the groove resist transmission of the electromagnetic signals into the body of the tool.

10. An antenna assembly for a downhole tool having a tool body, the antenna assembly comprising:
a coil assembly carried by the tool body;
a ferrite assembly carried by the tool body and positioned radially inward of the coil assembly, wherein the ferrite assembly comprises a non-magnetic sleeve in which a groove is defined and a plurality of non-elongated ferrite objects retained within the groove, the ferrite objects having a length compatible with the groove to be installed within the groove and traverse the groove, wherein the ferrite objects are selected from a group consisting of spherically shaped balls, button shaped discs, elliptically shaped discs, cylindrically shaped rods, and polygon shaped rods installed in an end-to-end arrangement along a length of the groove.

11. The assembly of claim 10, wherein the groove includes a plurality of grooves, and wherein the ferrite objects installed in each groove extend longitudinally along the sleeve and each groove is circumferentially spaced apart.

12. The assembly of claim 10, wherein the groove is formed along an outer surface of the sleeve.

13. The assembly of claim 10, wherein the groove is formed along an inner surface of the sleeve.

14. The assembly of claim 10, wherein the groove is characterized by an opening of a first cross-sectional width and a cavity, radially inward of the opening, the cavity having a second cross-section width greater than the first width.

15. The assembly of claim 10, wherein the groove includes a plurality of grooves and each groove is spaced apart from adjacent ones of the grooves, and wherein portions of the ferrite objects are installed in each groove.

16. The assembly of claim 10, wherein the ferrite objects installed in the groove resist transmission of the electromagnetic signals into the body of the downhole tool.

17. An antenna assembly for a downhole tool having a tool body, the antenna assembly comprising:
   a coil assembly carried by the tool body and disposed in an exterior recess of the tool body;
   a ferrite assembly carried by the tool body, wherein the ferrite assembly is positioned radially inward of the coil assembly and radially outward from the tool body,
   wherein the ferrite assembly comprises a non-magnetic first sleeve in which a first groove is defined and a plurality of non-elongated ferrite objects are retained within the first groove by a shape of the first groove,
   wherein the shape comprises a cavity formed radially inward from an opening of the first groove,
   wherein the cavity is larger than the opening,
   wherein a width of the ferrite objects are smaller than the cavity and larger than the opening, and
   wherein the ferrite objects are selected from a group consisting of spherically shaped balls, button shaped discs, elliptically shaped discs, cylindrically shaped rods, and polygon shaped rods installed in an end-to-end arrangement along a length of the groove.

18. The assembly of claim 17, wherein the coil assembly comprises a second sleeve in which a second groove is defined, wherein the second groove extends helically around the second sleeve and a conductor is disposed in the second groove to form an antenna coil.

\* \* \* \* \*